United States Patent
Balkus, Jr. et al.

(10) Patent No.: US 7,794,833 B2
(45) Date of Patent: *Sep. 14, 2010

(54) ELECTROSPUN MESOPOROUS MOLECULAR SIEVE FIBERS

(75) Inventors: Kenneth J. Balkus, Jr., The Colony, TX (US); John P. Ferraris, Coppell, TX (US); Sudha Madhugiri, Richardson, TX (US); Ashley S. Scott, Grove City, OH (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/601,102

(22) Filed: Jun. 20, 2003

(65) Prior Publication Data

US 2004/0137225 A1    Jul. 15, 2004

Related U.S. Application Data

(60) Provisional application No. 60/390,798, filed on Jun. 21, 2002.

(51) Int. Cl.
*D02G 3/02* (2006.01)

(52) U.S. Cl. .................................. 428/364; 428/391

(58) Field of Classification Search ................ 428/365, 428/372; 264/10, 441
See application file for complete search history.

(56) References Cited

U.S. PATENT DOCUMENTS

| | | | | |
|---|---|---|---|---|
| 4,043,331 A | * | 8/1977 | Martin et al. | 602/45 |
| 4,044,404 A | * | 8/1977 | Martin et al. | 623/1.54 |
| 4,127,706 A | * | 11/1978 | Martin et al. | 429/122 |
| 4,323,525 A | * | 4/1982 | Bornat | 264/441 |
| 4,689,186 A | * | 8/1987 | Bornat | 264/6 |
| 4,878,908 A | * | 11/1989 | Martin et al. | 623/1.54 |
| 5,645,891 A | * | 7/1997 | Liu et al. | 427/376.2 |
| 6,146,602 A | * | 11/2000 | Narula et al. | 423/213.5 |
| 6,329,017 B1 | * | 12/2001 | Liu et al. | 427/240 |
| 6,630,170 B2 | * | 10/2003 | Balkus et al. | 424/489 |
| 6,696,258 B1 | * | 2/2004 | Wei et al. | 435/7.2 |
| 6,737,447 B1 | * | 5/2004 | Smith et al. | 523/105 |
| 6,800,155 B2 | * | 10/2004 | Senecal et al. | 156/62.4 |
| 6,855,366 B2 | * | 2/2005 | Smith et al. | 427/2.1 |
| RE40,299 E | * | 5/2008 | Bruinsma et al. | 423/335 |
| 2001/0045547 A1 | * | 11/2001 | Senecal et al. | 252/501.1 |
| 2003/0017208 A1 | * | 1/2003 | Ignatious et al. | 424/486 |
| 2003/0168756 A1 | * | 9/2003 | Balkus et al. | 264/10 |
| 2004/0037813 A1 | * | 2/2004 | Simpson et al. | 424/93.7 |

(Continued)

FOREIGN PATENT DOCUMENTS

WO    WO 98/24724    *    6/1998

*Primary Examiner*—Jill Gray
(74) *Attorney, Agent, or Firm*—Winstead PC

(57) ABSTRACT

Electrospun fibers comprising mesoporous molecular sieve materials are described. In an aspect of the invention, fibers are electrospun from a conducting solution to which a high voltage electric current is applied. The apparatus includes in one aspect one or more conducting solution introduction devices for providing a quantity of conducting solution, said conducting solution introduction devices being electrically charged thereby establishing an electric field between said conducting solution introduction devices and a target, and means for controlling the flow characteristics of conducting solution from said one or more conducting solution introduction devices.

5 Claims, 13 Drawing Sheets

Electrospinning set up in a plexi glass box

U.S. PATENT DOCUMENTS

2004/0106343 A1* 6/2004 Senecal et al. .............. 442/117
2004/0131753 A1* 7/2004 Smith et al. .................. 427/2.1
2004/0137225 A1* 7/2004 Balkus et al. ................ 428/364
2004/0156904 A1* 8/2004 Saltman et al. ............. 424/486

* cited by examiner a b a b

ELECTROSPUN MESOPOROUS MOLECULAR SIEVE FIBERS

CROSS REFERENCES TO RELATED APPLICATIONS

This application claims priority to U.S. Provisional Application Ser. No. 60/390,798 filed on Jun. 21, 2002, which is fully incorporated by reference herein.

STATEMENT REGARDING FEDERALLY SPONSORED RESEARCH

The invention was made in part with United States Government support awarded by the National Science Foundation. The U.S. Government has certain rights in the invention.

BACKGROUND OF THE INVENTION

1. Technical Field of the Invention

The present invention relates to electrospun fibers comprising at least one mesoporous material. The present invention also relates to a mesh or network of inorganic fibers formed by electrospinning.

2. Description of the Prior Art

The electrospinning process involves the application of a strong electrostatic field to a capillary connected with at least one reservoir containing a conducting solution. Under the influence of the electrostatic field, a pendant droplet of the conducting solution at the capillary tip is deformed into a conical shape. If the voltage surpasses a threshold value, electrostatic forces overcome the surface tension, and a fine charged jet is ejected. The jet moves towards a ground plate acting as an electrode. The solvent begins to evaporate immediately after the jet is formed. The result is the deposition of thin fibers on a substrate in front of the electrode.

Electrospinning makes it relatively easy to spin continuous nanofibers from many different materials including, but not limited to, polymers. Electrospinning provides a straightforward and practical way to produce fibers with diameters ranging from few to about 2000 nm. These small fibers can support arrays of nanomachines and connect integrated arrays of nanomachines to larger scale systems.

U.S. Pat. No. 4,323,525, which is fully incorporated by reference herein, is directed to a process for the production of tubular products by electrostatically spinning a liquid containing a fiber-forming material. The process involves introducing the liquid into an electric field through a nozzle, under conditions to produce fibers of the fiber-forming material, which tend to be drawn to a charged collector, and collecting the fibers on a charged tubular collector which rotates about its longitudinal axis, to form the fibrous tubular product. It is also disclosed that several nozzles can be used to increase the rate of fiber production.

U.S. Pat. No. 4,689,186, which is fully incorporated by reference herein, is directed to a process for the production of polyurethane tubular products by electrostatically spinning a fiber-forming liquid containing the polyurethane. It is disclosed that auxiliary electrodes can be placed around the collector to help facilitate collection of the fibers. It is disclosed that the auxiliary electrodes can be arranged to facilitate separation or to prevent adhesion of the formed fibers.

The present invention relates to a network of fibers comprising mesoporous molecular sieve fibers, formed by electrospinning. The above mentioned references do not teach or suggest the production of mesoporous molecular sieve fibers. These fibers have numerous commercial applications including, but not limited to, use in sensors and biosensors, scaffolds for cell growth for artificial skin or bone, optical and electronic devices, nanotube composites, solar cells, fuel cells, smart textiles and paper. The electrospun polymer fibers discussed in the prior art cannot be substituted in place of the mesoporous molecular sieve fibers used in the above-referenced applications. Thus, there is a need for developing fibers comprising mesoporous molecular sieves.

SUMMARY OF THE INVENTION

According to the present invention, it has now been found that fibers comprising at least one mesoporous molecular sieve can be produced by an electrospinning process.

An embodiment of the invention provides electropsun fibers produced by a method comprising,
  establishing an electric field between a conducting solution introduction device and a target,
  feeding said conducting fluid from a reservoir to the conducting solution introduction device,
  forming a jet of said conducting solution,
  applying an electric current to said jet to form fibers, and,
  collecting said fibers on a target, wherein said conducting solution comprises at least one mesoporous material.

In an aspect, the invention relates to producing electrospinning fibers from a conducting solution to which a high voltage electric current is applied. The conducting solution comprises at least one mesoporous precursor material. The mesoporous precursor material is placed in a reservoir as indicated in FIG. 1.

Preferably, the conducting solution is fed to a conducting solution introduction device at a controlled rate. The rate can be controlled by maintaining the conducting fluid at a constant pressure or constant flow rate. In certain embodiments of the invention, the conducting solution introduction device comprises a needle attached to a reservoir containing mesoporous precursor material. In other embodiments of the invention, the conducting solution introduction device comprises a glass pipette attached to the reservoir containing mesoporous precursor material.

In an embodiment of the invention, the electrical field strength at the needle tip is controlled to provide a controlled diameter fiber.

In another aspect, the invention relates to electrospun fibers produced using a conducting fluid comprising at least one mesoporous precursor material in the presence of an electric field established between a conducting fluid introduction device and a ground source, which includes:
  a) forming an electrospinning jet stream of the conducting fluid; and,
  b) electrically controlling the flow characteristics of the jet stream.

An aspect of the invention provides an electrospinning apparatus comprising one or more conducting solution introduction devices for providing a quantity of conducting solution, said conducting solution introduction devices being electrically charged thereby establishing an electric field between said conducting solution introduction devices and a target; and means for controlling the flow characteristics of conducting solution from said one or more conducting solution introduction devices.

The flow characteristics of the jet stream can be electrically controlled by at least one electrode.

Preferably, the means for independently controlling the flow characteristics includes at least one electrode disposed adjacent to the conducting fluid introduction device.

The means for independently controlling the flow characteristics can include a means for individually electrically turning on and off a respective conducting fluid introduction device.

The electrospinning apparatus will preferably include a pump system or a pressure source for supplying conducting fluid to at least one conducting fluid introduction device.

An embodiment of the invention provides a network of fibers, wherein said network comprises a mesh of mesoporous molecular sieve fibers, and said fibers are produced by electrospinning.

The present invention provides electrospun fibers comprising mesoporous molecular sieves by electrospinning.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of the invention presented herein.

DETAILED DESCRIPTION OF ILLUSTRATIVE EMBODIMENTS

The present invention is directed to electrospun fibers comprising mesoporous materials produced by electrospinning.

The present invention is further directed to a network of fibers produced by electrospinning comprising mesoporous molecular sieve fibers The electrospinning process is driven by the electrical forces on free charges on the surface or inside a conducting solution. In conventional spinning, the fiber is subject to tensile, rheological, gravitational, inertial and aerodynamic forces. In electrospinning, the tensile force is generated by the interaction of an applied electric charge carried by the jet rather than by the spindles and reels in conventional spinning. Electrical forces in non-axial directions are also important.

By "flow characteristics" (of the conducting solution) is meant the jet formation and jet acceleration of the conducting solution which exits from the conducting solution introduction device, e.g., the needle tip or glass pipette tip, as well as the directional flow of the jet stream in three dimensional space. Thus, controlling the flow characteristics can include controlling jet formation, controlling jet acceleration, directing the jet stream to a desired target in three dimensional space, steering the jet stream to different targets during the spinning process or a combination of these.

The invention is directed to electrospun fibers produced from a conducting solution comprising at least one mesoporous molecular sieve precursor material.

Figure 1:
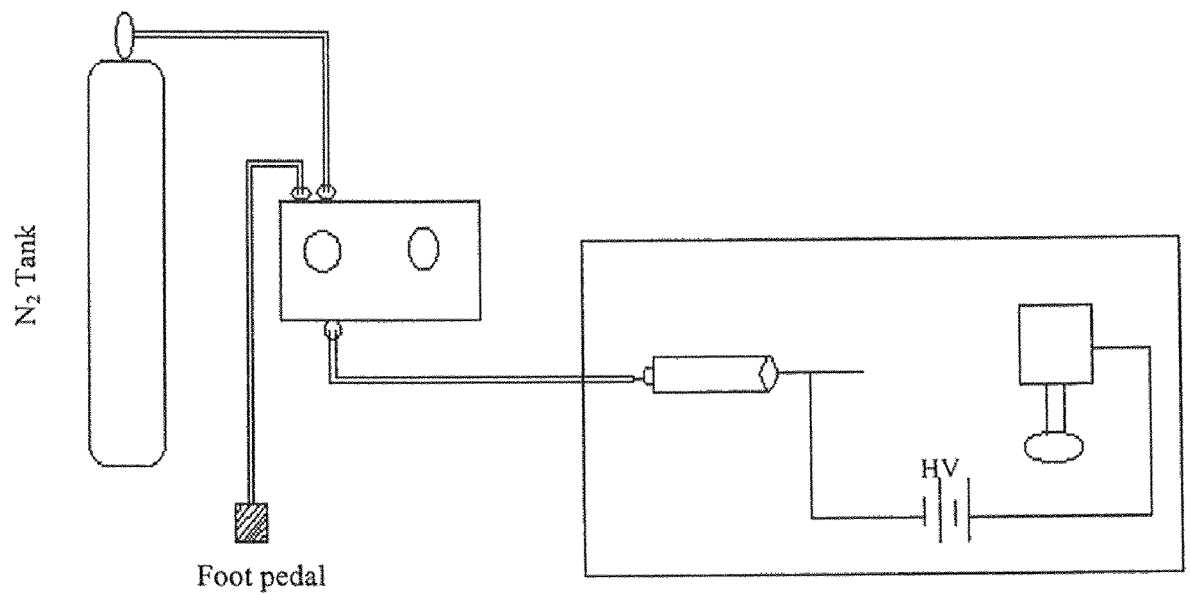
FIG. 1 represents a schematic representation of the electrospinning apparatus.
Figure 2:
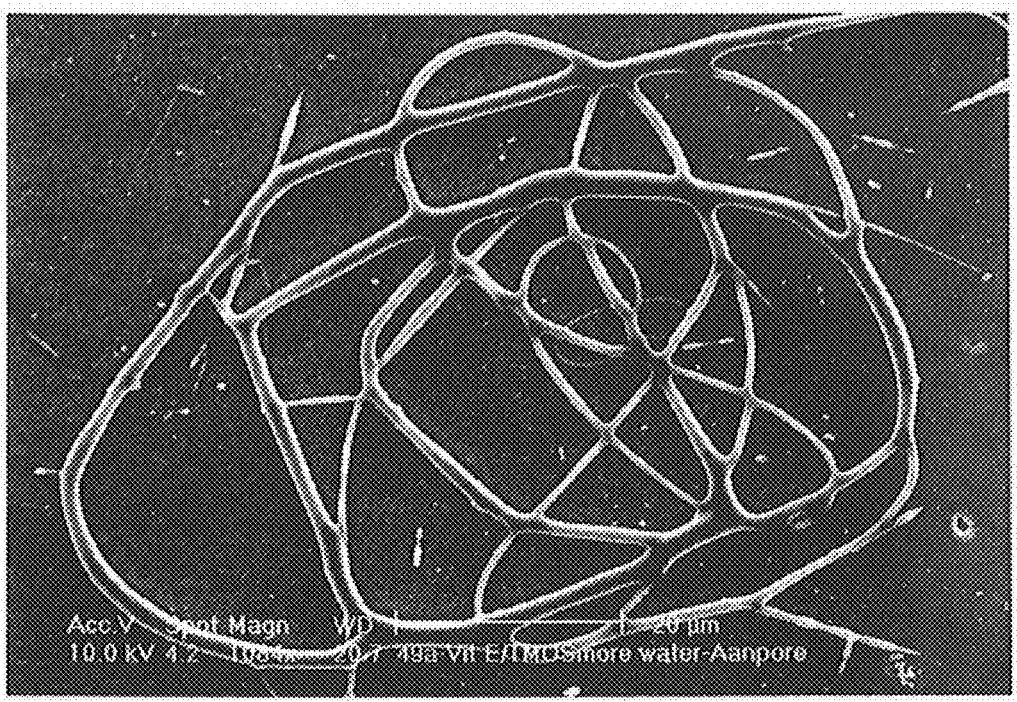
FIG. 2 (panels "a" and "b") represents mesoporous molecular sieve fibers comprising Vitamin E d-α-tocopheryl polyethylene glycol 1000 succinate (vitamin E TPGS) and Tetramethylorthosilicate (TMOS).
Figure 2:
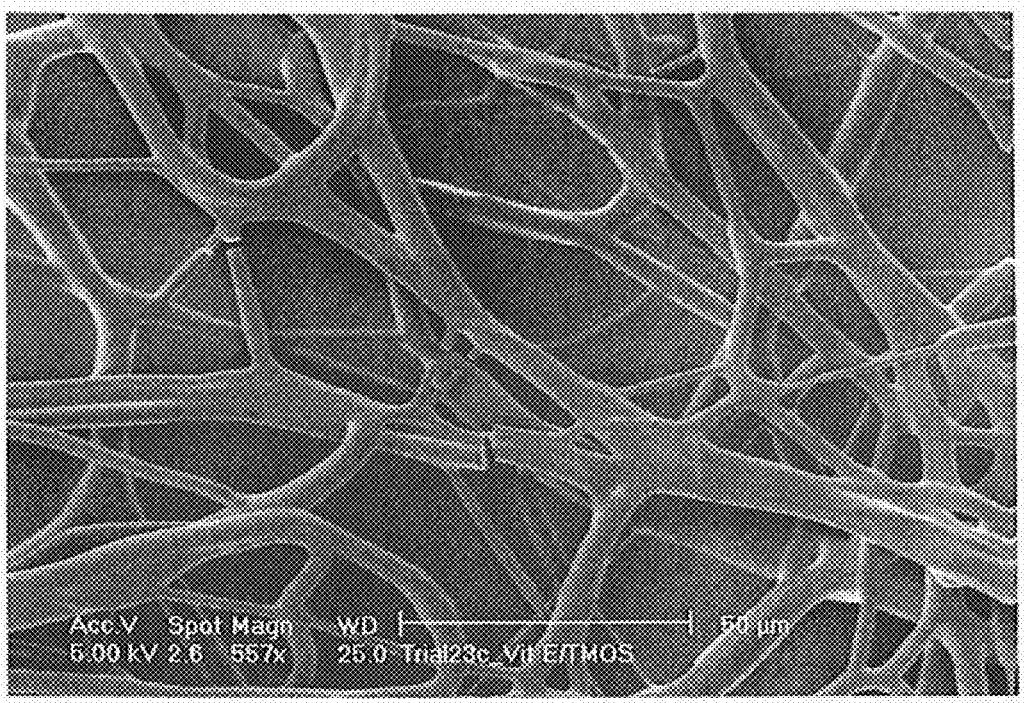
Figure 3:
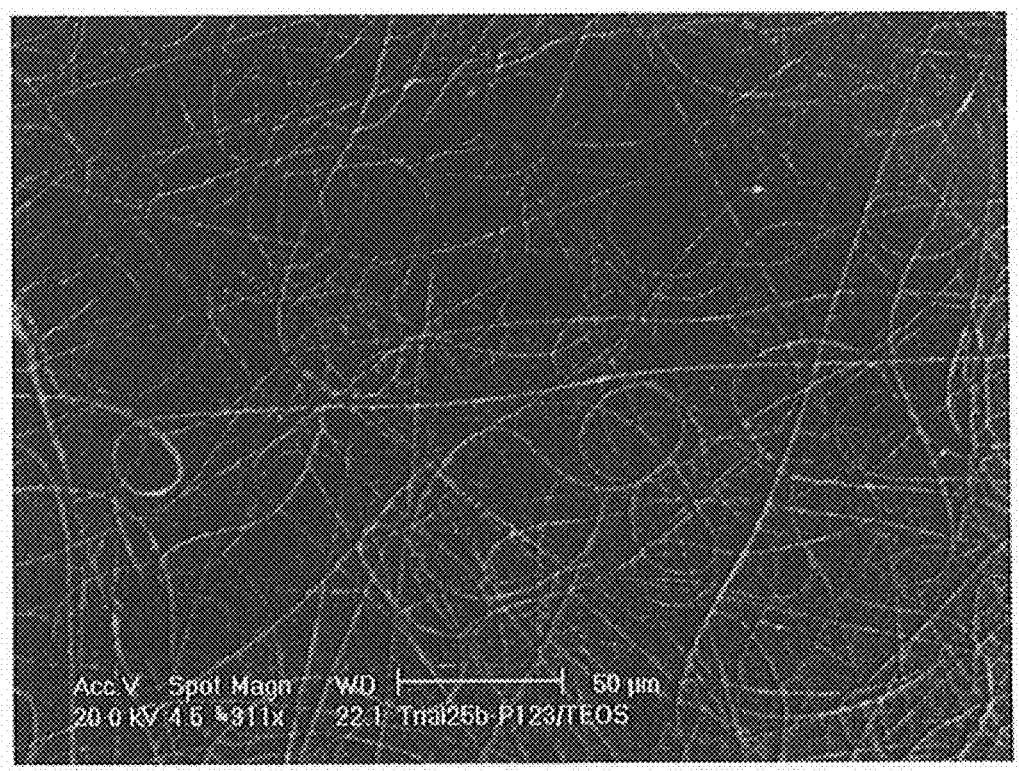
FIG. 3 (panels "a" and "b") represents P-123/TMOS fibers spun onto an acid-treated glass cover slip.
Figure 3:
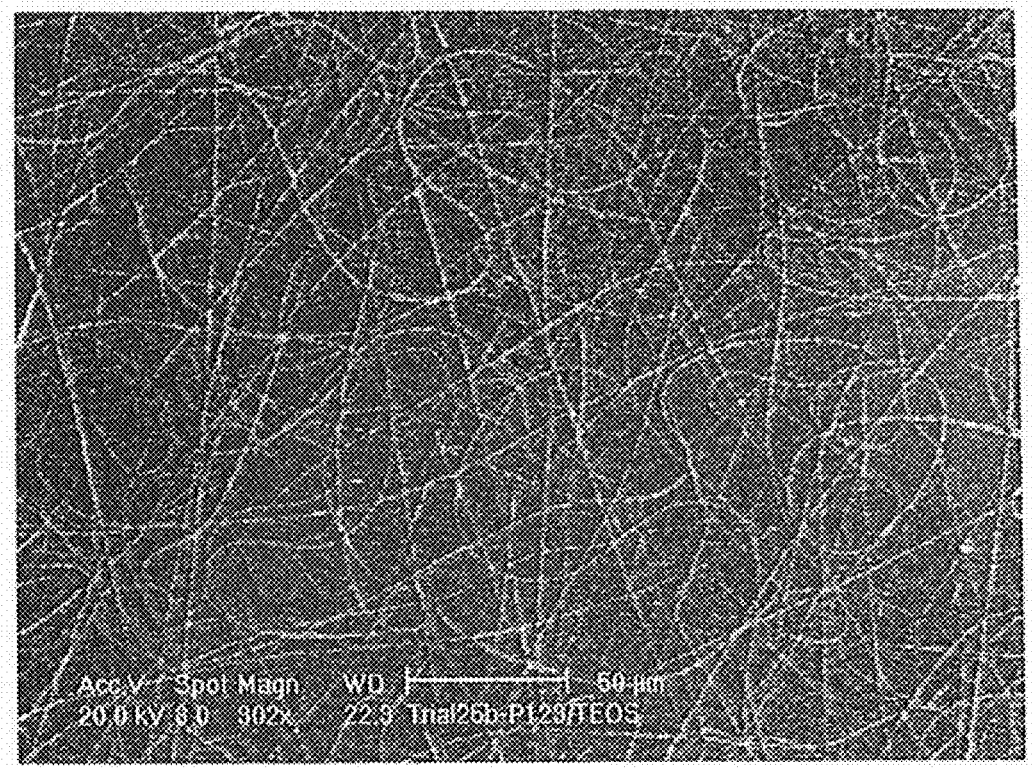
Figure 4:
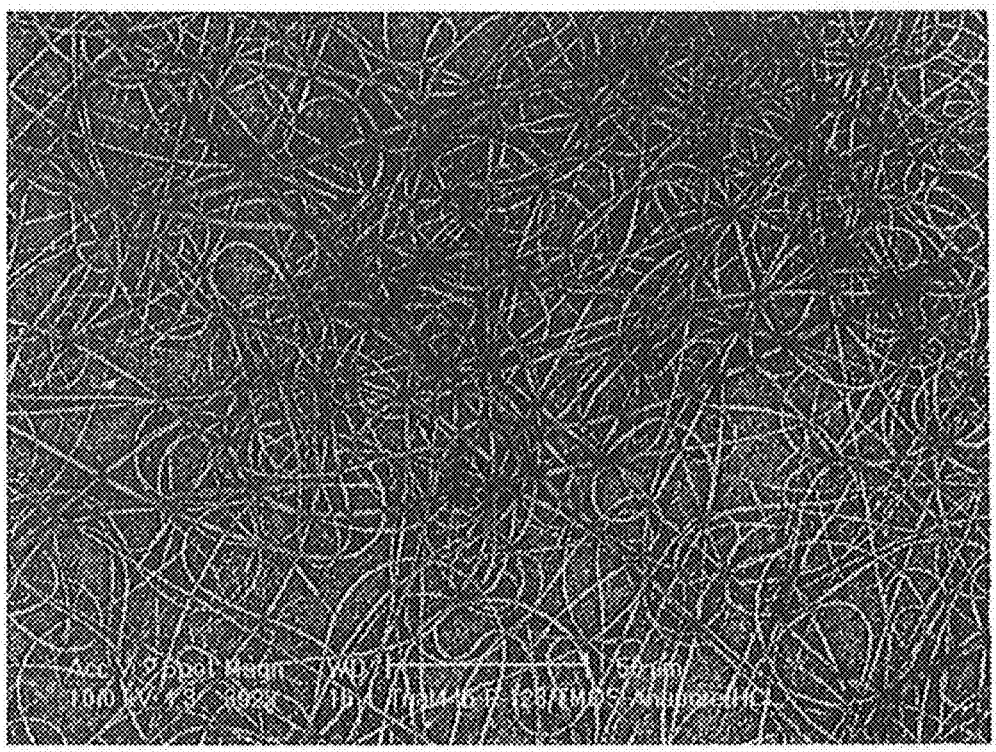
FIG. 4 (panels "a" and "b") represents P-123/TMOS fibers spun onto an acid-treated anapore filter.
Figure 4:
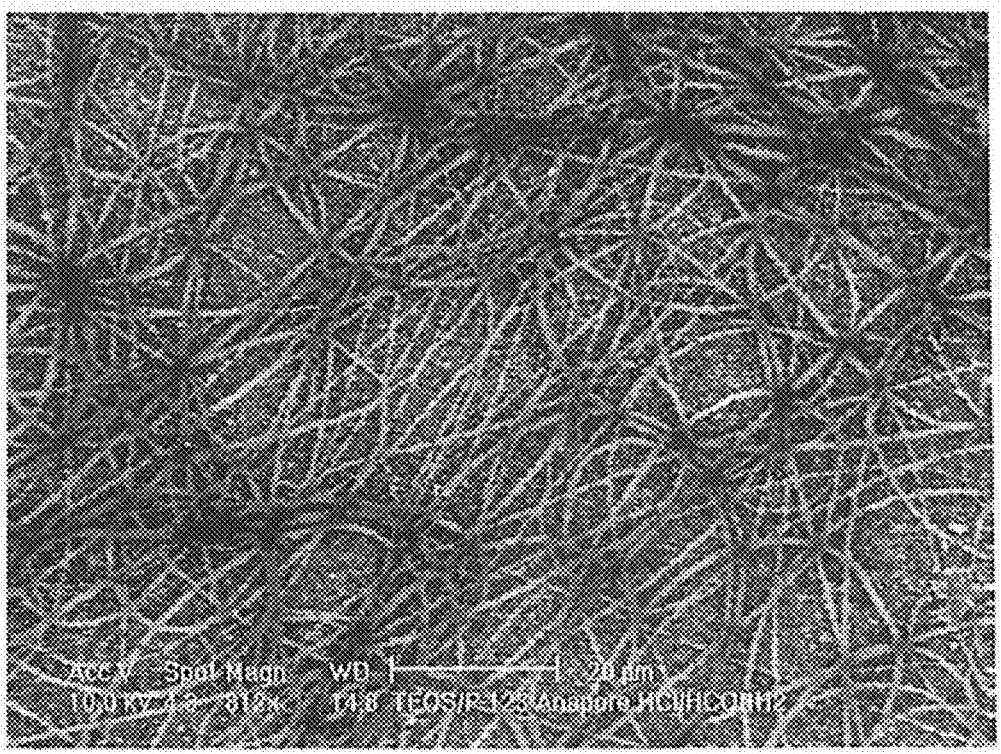
Figure 5:
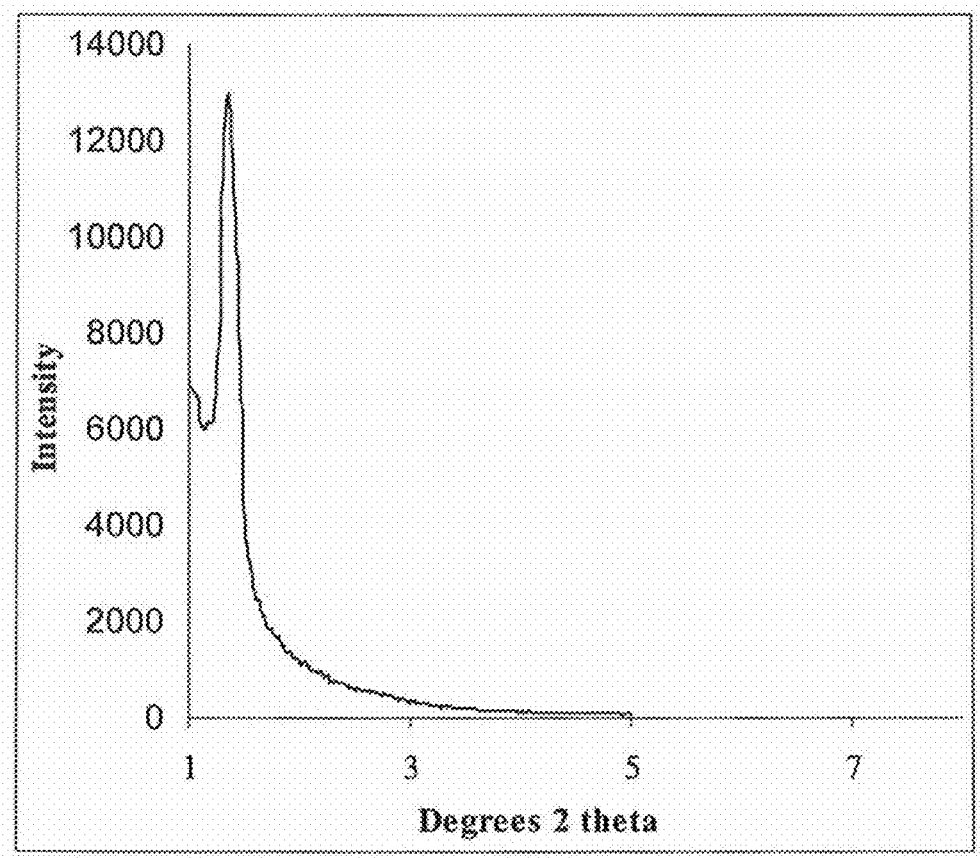
FIG. 5 (panels "a" and "b") represents X-ray diffraction patterns of (a) vitamin E TPGS fibers and (b) SBA-1 fibers.
Figure 5:
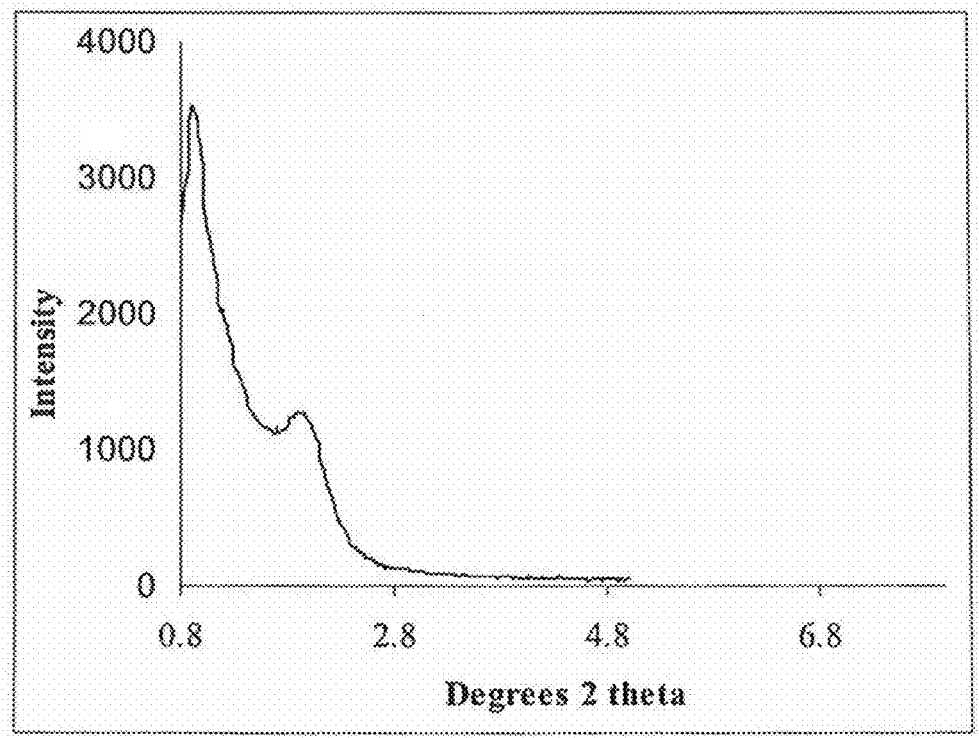

An aspect of the invention provides an electrospinning apparatus comprising at least one conducting solution introduction device for providing a quantity of conducting solution, said conducting solution introduction device being electrically charged thereby establishing an electric field between said conducting solution introduction device and a target, and means for controlling the flow characteristics of conducting solution from said conducting solution introduction device. A preferred embodiment of the claimed apparatus is shown in FIG. 1.

The flow characteristics of the jet stream can be electrically controlled by at least one electrode.

Preferably, the means for independently controlling the flow characteristics includes at least one electrode disposed adjacent to the conducting fluid introduction device.

The means for independently controlling the flow characteristics can include a means for individually electrically turning on and off a respective conducting fluid introduction device.

The electrospinning apparatus will preferably include a pump system or a pressure source for supplying conducting fluids to at least two individual conducting fluid introduction devices.

The conducting solution comprises at least one mesoporous precursor material described more fully below. As used herein, the term "mesoporous precursor material" refers to the precursor materials used in the synthesis of molecular sieves, including but not limited to, gels prepared with surfactants, as discussed further below.

In an aspect of the invention, the mesoporous precursor material is placed in a reservoir. In this aspect, the mesoporous molecular sieve fibers are formed in situ during the electrospinning process.

The mesoporous precursor material is fed to an introduction device at a controlled rate. The rate can be controlled by maintaining the conducting solution, i.e., at least one mesoporous precursor material, at a constant pressure or constant flow rate. In certain embodiments of the invention, the introduction device-comprises a needle attached to each of the separate reservoirs containing different mesoporous precursor materials, respectively. In an embodiment of the invention, the needle is a metal needle with a flat tip. In other embodiments of the invention, the introduction device comprises a glass pipette attached to each of the separate reservoirs containing different mesoporous precursor materials, respectively.

The reservoirs containing the mesoporous precursor materials are placed in close proximity to one another, such that the conducting solution introduction devices attached to each reservoir are placed in close proximity to one another. In certain embodiments of the invention, the conducting solution introduction devices attached to the reservoir containing the different mesoporous precursor materials are placed less than about 5 mm apart.

In order to create an electric field, at least one negative (or positive) electrode is introduced to the one or more conducting solution introduction devices, and at least one positive (or negative) electrode is introduced to a target in the collection region. The collection region is where the jet of conducting fluid is stopped. A target is provided in the collection region to collect the electrospun fibers. The target is preferably located in front of the electrode in the collection region. In certain embodiments of the invention, the electrode in the collection region can also serve as a target.

A suitable target can be a metal screen, mechanical reel or aerodynamic current. Suitable targets also include rotating barrels which can be used to wind the fibers in a yarn-like form. For materials dissolved in non-volatile solvents, water or other appropriate aqueous liquids can be used to collect the jet, remove the solvent, and coagulate the fibers.

The mesoporous precursor material may be dissolved in a solvent selected from hydrochloric acid (HCl), ethanol, water or mixtures of these solvents.

The conducting fluid can optionally contain a salt which creates an excess charge effect to facilitate the electrospinning process. Examples of suitable salts include NaCl, $KH_2PO_4$, $K_2HPO_4$, $KIO_3$, KCl, $MgSO_4$, $MgCl_2$, $NaHCO_3$, $CaCl_2$ or mixtures of these salts.

The conducting fluid can optionally contain carbon nanotubes, which become charged and facilitate fiber formation.

The apparatus and methods according to the invention can be used for electrospinning any fiberizable material, including but not limited to mesoporous precursor material. Examples of mesoporous precursor materials include, but are not limited to materials which comprise gels prepared with surfactants. The list of surfactants include, but are not limited to, pluronic P-123, pluronic F-127, pluronic F-77, pluronic P-104, pluronic F-38, pluronic L-121 and mixtures thereof. Other surfactants that can be used in embodiments of the present invention include, but are not limited to, Vitamin E alphatocopherylpolyethylene glycol 1000 succinate (Vitamin E TPGS), Tergitols, Triton-X, polyethylene glycol (different molecular weights), alkyl ammonium halides, alkyl amines and mixtures thereof. Examples of mesoporous precursor materials additionally include, but are not limited to, materials comprising synthetic mesoporous materials such as those belonging to the SBA series, metal oxides such as silicon dioxide ($SiO_2$), aluminum oxide ($Al_2O_3$), titanium dioxide ($TiO_2$), niobium oxide ($Nb_2O_5$), tungsten oxide ($WO_3$), tantalum oxide ($Ta_2O_5$), vanadium pentoxide ($V_2O_5$) and mixtures thereof, as well as, electrically conducting mixed metal oxides including, but not limited to, indium tin oxide, calcium aluminate and mixtures thereof.

The electric field created in the electrospinning process will preferably be in the range of about 5 to about 100 kilovolts (kV), more preferably about 10 to about 50 kV. The feed rate of the conducting fluid to the spinneret (or electrode) will preferably be in the range of about 0.1 to about 1000 microliters/minute, more preferably about 1 to about 250 microliters/minute.

The conducting solution is supplied to one or more conducting solution introduction devices by a pump system or a pressure source. The pressure source is preferably a nitrogen source, whose pressure can be controlled by a foot-pedal. Application of a low pressure to the conducting solution ensures a steady flow of the solution to the conducting solution introduction device.

The properties of the resulting fibers produced by electrospinning will be affected by the electric and mechanical properties of the conducting fluid. The conductivity of the macromolecular solution can be drastically changed by adding ionic inorganic/organic compounds. The magneto-hydrodynamic properties of the fluid depend on a combination of physical and mechanical properties, (e.g., surface tension, viscosity and viscoelastic behavior of the fluid) and electrical properties (e.g., charge density and polarizability of the fluid). For example, by adding a surfactant to the conducting solution, the fluid surface tension can be reduced, so that the electrostatic fields can influence the jet shape and the jet flow over a wider range of conditions. By coupling a pump system or pressure source that can control the flow rate either at constant pressure or at constant flow rate, the effect of viscosity of the conducting fluid can be alleviated.

In another preferred embodiment for producing electrospun fibers according to the present invention, the jet stream flight is also precisely controlled.

It is believed that a change in charge density (through the addition of salts) can significantly affect the fiber diameter. Thus, it is believed that higher excess charge density generally favors the production of thinner fibers and lower excess charge density favors the production of thicker fibers. Several kinds of salts (e.g. NaCl, $KH_2PO_4$, KIO and $K_3PO_4$), which are all biologically compatible to the body, are also contemplated.

An embodiment of the invention provides a method of making a network of fibers, wherein said network comprises mesoporous molecular sieve fibers, and said fibers are produced by electrospinning. The network or mesh of non-woven fibers thus produced displays properties that are not present in the fibers prepared using polymers alone.

The methods and apparatus according to the invention are capable of producing fibers having diameters in the range from less than 10 up to about 1,000 nanometers, more preferably about 20 to about 500 nanometers.

It is also possible to produce fibers having different diameters with a controlled percentage of sub-micron diameter fibers.

Optionally, additives, e.g., one or more medicinal agents, can be incorporated into the fibers produced in accordance with the invention. The additives can be mixed with the fiberizable material and can be placed within the pores of fibers comprising mesoporous materials.

The chemical composition of the mesoporous molecular sieve fibers and the fiber diameter can be controlled to provide selectable performance criteria. The mesoporous molecular sieve fibers can also contain a plurality of fibers comprising different medicinal agents or different concentrations of medicinal agents. Such fibers offer unique treatment options with combinations of medicinal agents and release profiles.

WORKING EXAMPLES

The Process of Electrospinning

In the process of electrospinning, a high voltage electric current (20 kV) is applied to a solution, which causes a jet of the solution to form. The jet divides into many fibers, which divide and redivide to form a network of fibers. These are attracted to the oppositely charged electrode attached to a target. The fibers so formed are collected on the target.

Apparatus:

The gel for the mesoporous material SBA-15 is prepared as described later, and used for electrospinning. The gels prepared are transferred to clear barrels (which look like a syringe barrel without the plunger), which are part of a fluid dispensing system (EFD 1500 XL). Using the fluid dispensing system ensures steady flow of the gels. A needle with a cut tip was attached to one end of the barrel containing the gel for the mesoporous material. The needles which are straight or bent can be interchanged between syringe barrels. In addition, any number of solutions can technically be used in a similar way with minor modifications.

A nitrogen source, whose pressure can be controlled by a foot-pedal, was attached to the other ends of the plastic barrels. A glass 'T' is used to split the source of the nitrogen outlet. A low nitrogen pressure is applied to the gel to ensure a steady flow of the viscous gel. The two syringe barrels are placed one above the other in such a way that the needles are in close proximity to each other. A single negative electrode is attached to the needles and the positive electrode is attached to the target. A distance of 20-25 cm was maintained between the tip of the syringe and the target. The syringe barrels with needles and the target, which get exposed to high voltages are placed in a plexi-glass box for safety purposes. The schematic of the entire set up is shown in FIG. 1.

Gel Preparation and Electrospinning Process:

(a) SBA-15 Fibers:

Triblock copolymers of polyethylene oxide and polypropylene oxide (P-123), tetramethylorthosilicate (TMOS), ethanol, 2M HCl, and $H_2O$ were used in the molar ratios of 0.002644:0.0600:0.2605:0:00822:0.1044 for this gel. Required amount of P-123 was dissolved in ethanol and 2M HCl and water were added dropwise under constant stirring. The silica source, TMOS was then added drop wise under constant stirring to form a clear solution. The solution was transferred to a beaker and was heated at 60-70° C. until the desired viscosity is obtained. A 10 ml of the solution usually was heated for about an hour to obtain the desired viscosity. When heated, the ethanol slowly evaporates and partial hydrolysis and condensation of silica occurs forming a clear and viscous gel, which was then used for electrospinning.

Different organosilanes were partially substituted in spinning the fibers. The organosilanes tried were phenyltrimethoxy silane, p-aminophenyltrimethoxy silane. Phenyltrimethylchlorosilane (PTMCS) and trimethylchlorosilane (TMCS) were also partially substituted in the gel to make the gel more hydrophobic.

Aluminum foil, which is of low cost and easily available, was used as a target to collect the fibers. However, owing to the conditions under which the SBA-15 gel was prepared, very few SBA-15 fibers were formed. To improve the condensation of the SBA-15 fibers, other substrates were tried. Anapore filters with 200 nM pores and 20 nM pores were dipped in 2M HCl for 1 h and dried at 70° C. for 50-60 minutes. These HCl treated anapore filters were attached to the aluminum foil and fibers were spun on to these filters. The HCl in the pores facilitated the condensation of silica in the gel to form fibers.

(b) Titanium Dioxide ($TiO_2$) Fibers:

The gel for $TiO_2$ was prepared by dissolving a triblock copolymer of polyethylene oxide and polypropylene oxide ($PO_{70}EO_{20}PO_{70}$) commercially known as P-123 (BASF) in ethanol and hydrolyzing and condensing a titanium source in an acidic medium. The conditions were optimized to form a viscous gel suitable for electrospinning. In a typical gel preparation, 2 g of P-123 was dissolved in 4 gm of ethanol. To this a suspension of 0.01 moles of $Ti(O''C_4H_9)_4$ in 2 gm of ethanol was added followed by 0.5 gm of concentrated HCl. 1 ml of deionized water was added to the above mixture and stirred for 20-30 min at room temperature. The clear gel obtained was heated at a temperature of 45-50° C. for 5-6 h to obtain a clear viscous gel.

The gel obtained in the above said manner was taken in a plastic barrel part of the fluid dispension system and a voltage of 20 kV was applied. The fibers formed were collected on an aluminum foil which acted as a target placed at a distance of 22 cm. The fibers obtained were heated at 130° C. to facilitate the cross linking between titanium and oxygen. Furthermore, these fibers were calcined at 600° C. to remove the template (P-123). The fibers were found to be stable even after calcining at 900° C. We propose a mesoporous framework structure for these with anatase crystallized in the walls which transforms to rutile after heating to temperatures beyond 800° C.

Figure 6:
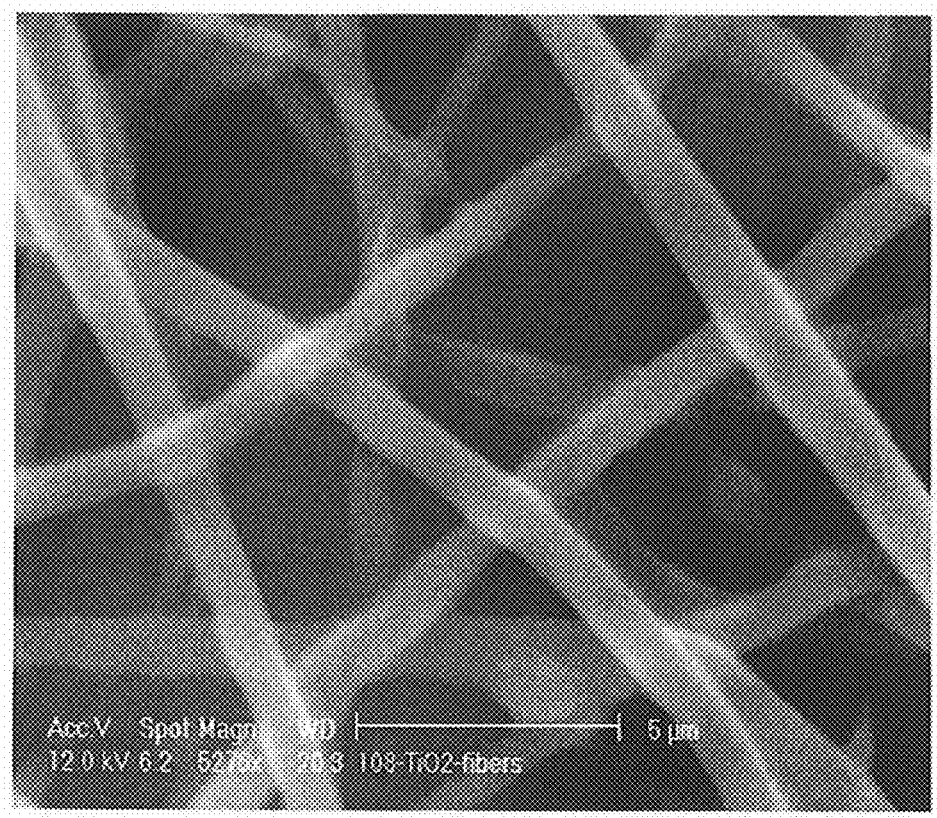
FIG. 6 (panels "a" and "b") represents scanning electron microscope (SEM) images of titanium oxide fibers before and after calcination.
Figure 6:
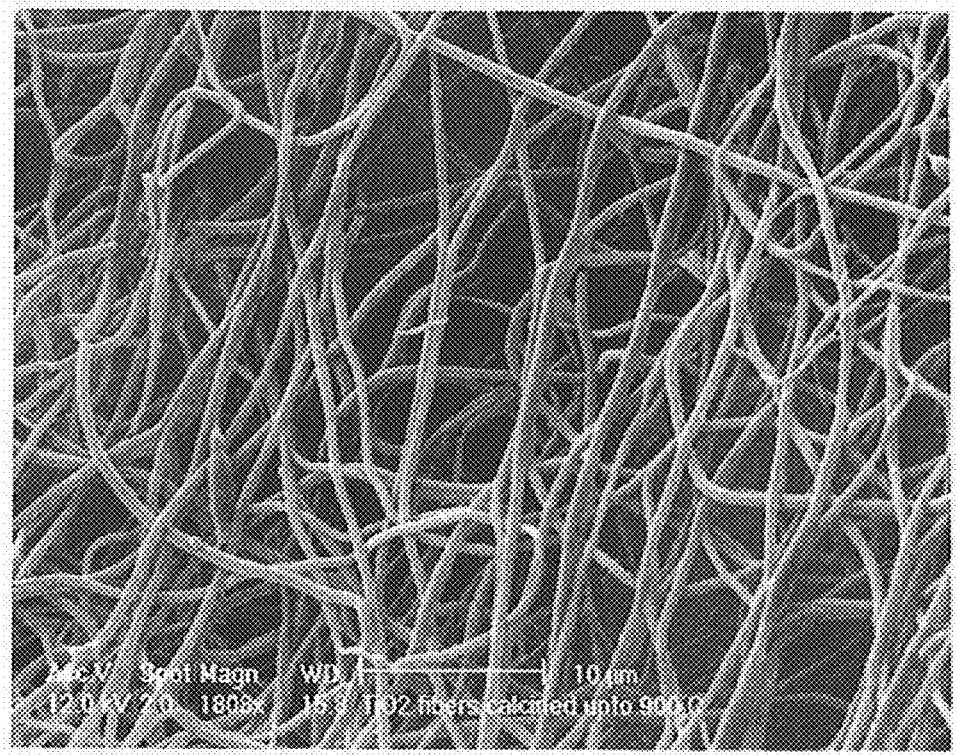
Figure 7:
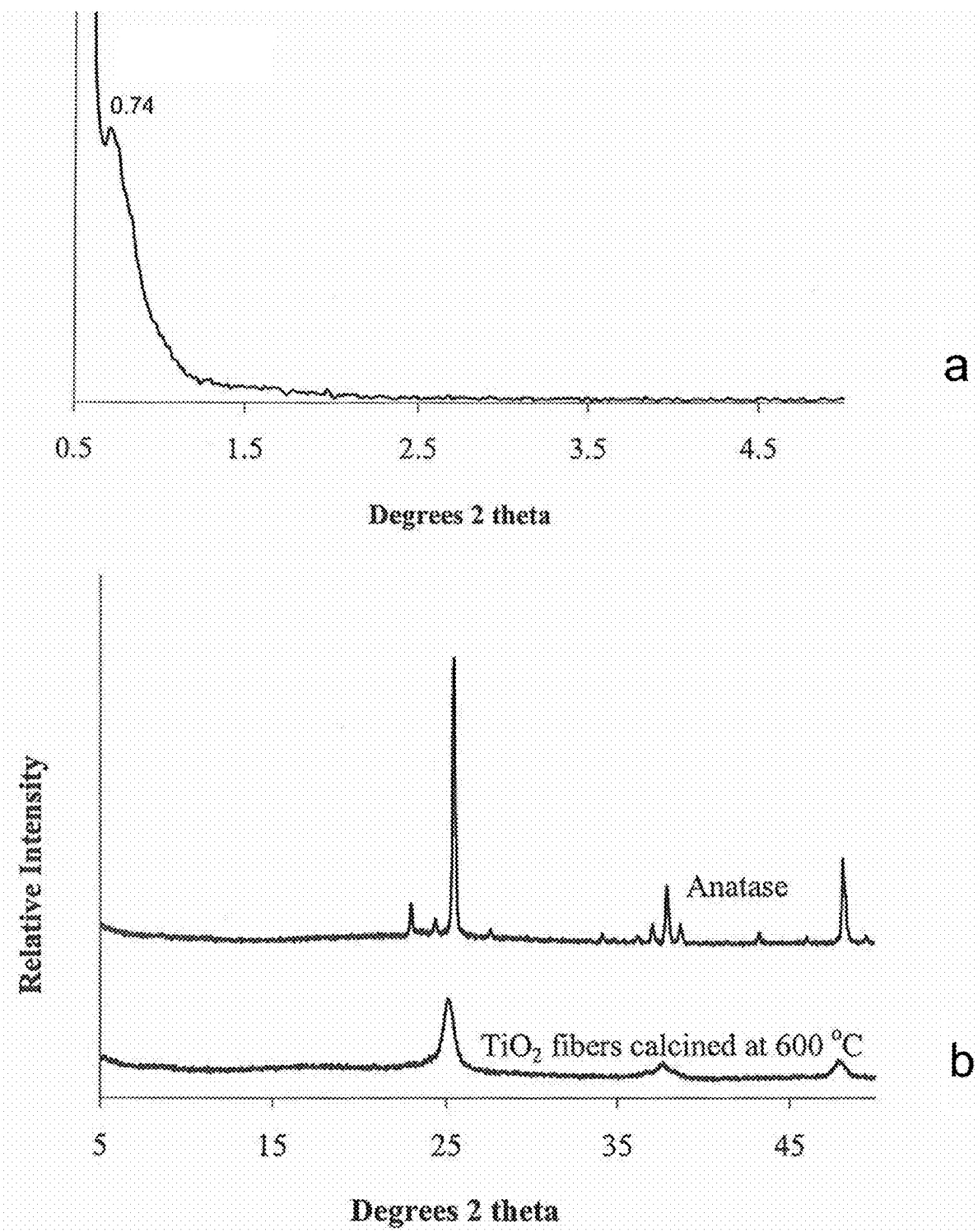
FIG. 7 represents the X-ray diffraction pattern obtained for titanium oxide fibers at low angle (FIG. 7a); Higher 2θ angle pattern (FIG. 7b) suggests the presence of anatase in the fibers.

The morphology, density and thickness of the fibers were examined using scanning electron microscope. The powder X-ray diffraction was used to characterize the extent of ordering in the electrospun materials. Scanning electron microscope images of the $TiO_2$ fibers before and after calcinations are shown in FIG. 6. X-ray diffraction patterns obtained for these fibers at low angle (FIG. 7a) suggests that these are mesoporous and the patterns obtained at higher 2θ angle (FIG. 7b) suggests the presence of anatase in the fibers.

(c) Mesoporous Tantalum Oxide Fibers:

Mesoporous tantalum oxide ($Ta_2O_5$) fibers were prepared using either Brij 76 or pluronic P-123 as the surfactants. $TaCl_5$ or $Ta(OC_4H_9)_5$ were used as the sources for tantalum. In a typical precursor gel preparation, Brij 76 or pluronic P-123 was dissolved in dry absolute ethanol and a suspension of either the metal alkoxide or the metal chloride in acidified ethanol was added to the surfactant solution. The entire mixture was stirred for ~30 min and was heated at 45-50° C. for 18-24 hours. The molar ratios of the reagents used when Brij 76 was used as the surfactant were 0.0014 Brij 76:0.13 ethanol:0.014 concentrated HCl:0.01 $Tacl_5/Ta(OC_4H_9)_5$ The molar ratios of the reagents used when P-123 was used as the surfactant were 0.0034 P-123:0.13 ethanol:0.014 concentrated HCl:0.01 $TaCl_5/Ta(OC_4H_9)_5$. The viscous, clear gel obtained after heating was charged into the plastic barrel part of the electrospinning set up and subjected to a high voltage of 20 kV. The fibers formed were collected on an aluminum target. However, $Ta_2O_5$ also forms fibers that can be picked up. The fibers thus formed were annealed at 130° C. for further condensation and calcined at 500° C. to remove the surfactant. The morphology of the fibers was characterized by SEM and the pore structure was determined by XRD.

Figure 8:
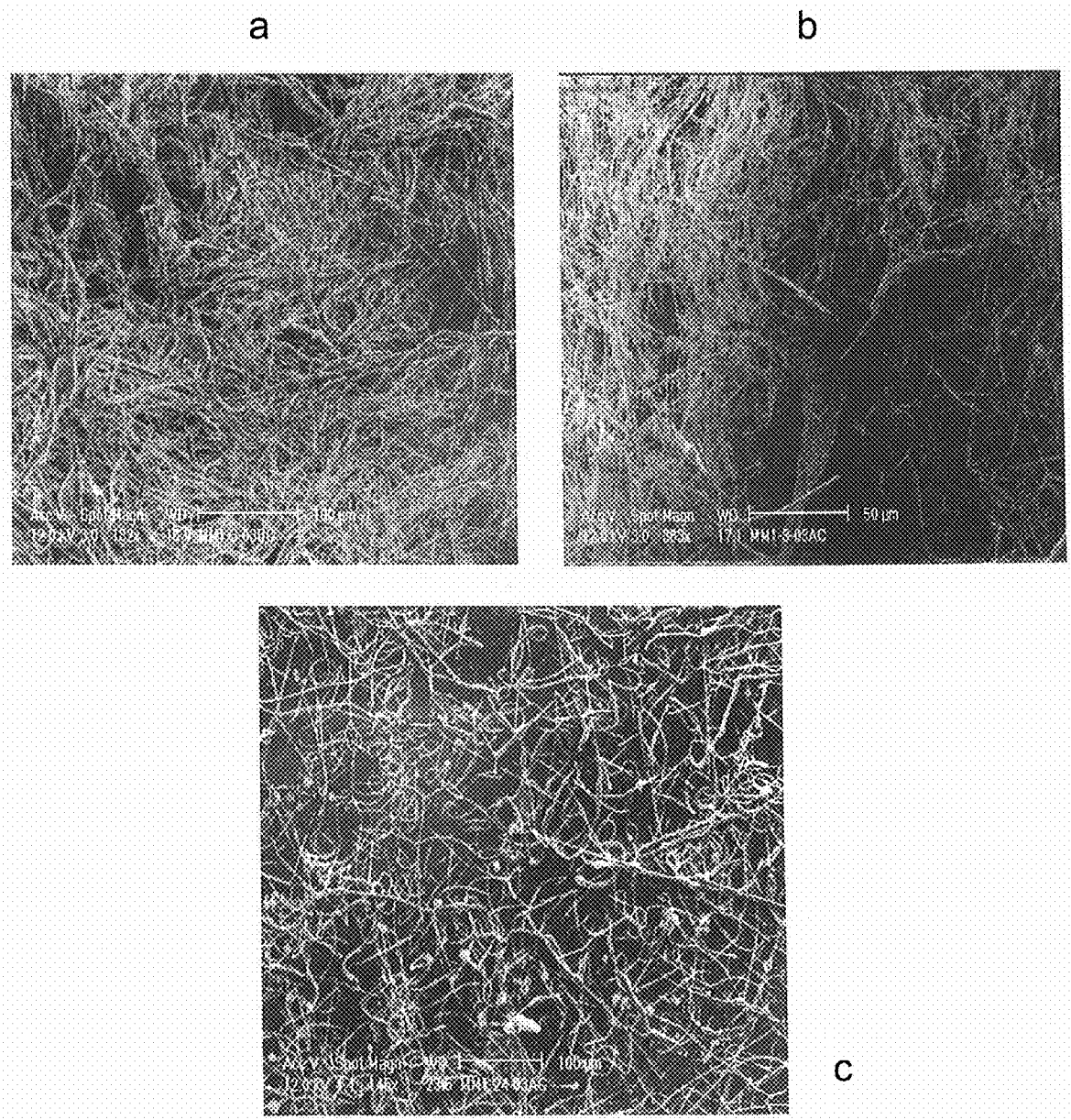
FIGS. 8a and 8b represent SEM images of tantalum oxide fibers before and after calcination.
FIG. 8c shows tantalum oxide fibers before calcination.
Figure 9:
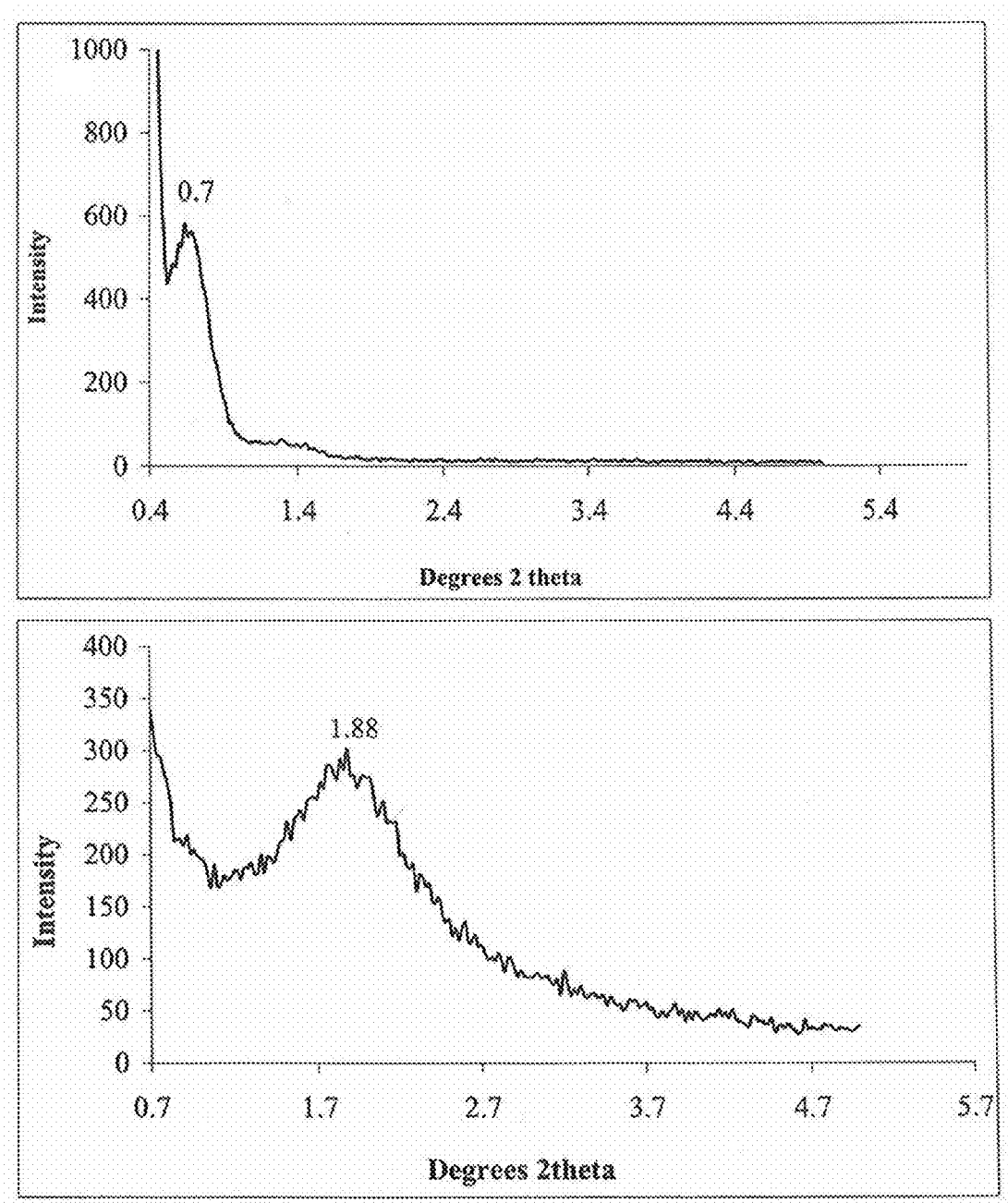
FIGS. 9a and 9b represent X-ray diffraction spectra of tantalum oxide fibers

FIGS. 8a and 8b show the SEM images of the $Ta_2O_5$ fibers prepared using Brij 76 and $TaCl_5$ before and after calcination. FIG. 8c shows the SEM image of $Ta_2O_5$ prepared using P-123 and $Ta(OC_4H_9)_5$ before calcination. FIG. 9a shows the XRD spectrum obtained for the fibers obtained using P-123 and $Ta(OC_4H_9)_5$ and 9b shows the spectrum obtained for the fibers obtained using Brij 76 and $TaCl_5$. The low angle X-ray pattern suggests that the fibers formed are mesoporous and the pore size obtained is smaller when Brij 76 was used as the surfactant.

Figure 10:
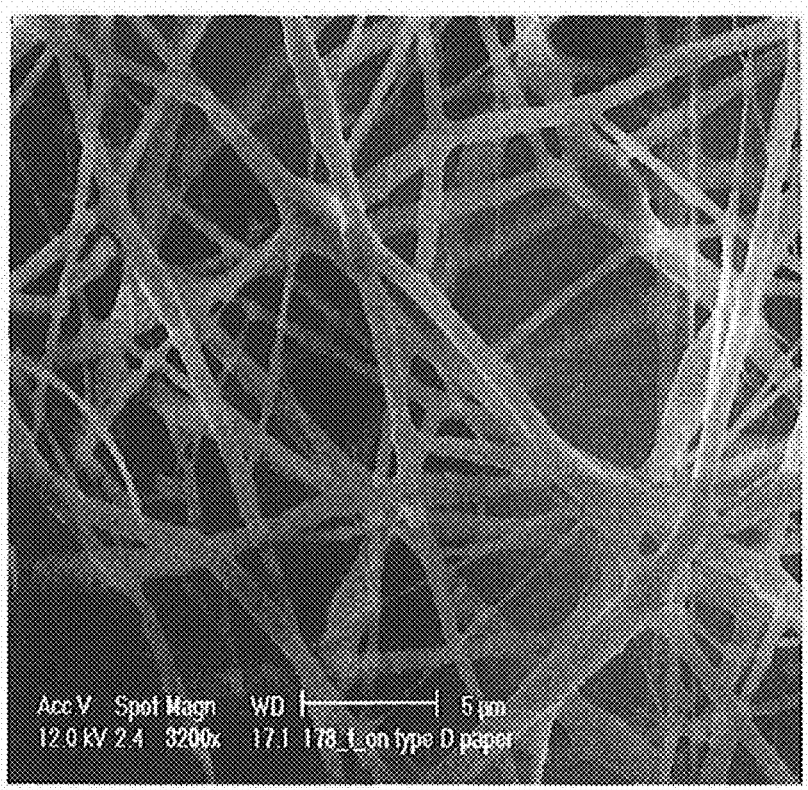
FIG. 10 (panels "a" and "b") represents SEM images of fluorinated tin oxide fibers.
Figure 10:
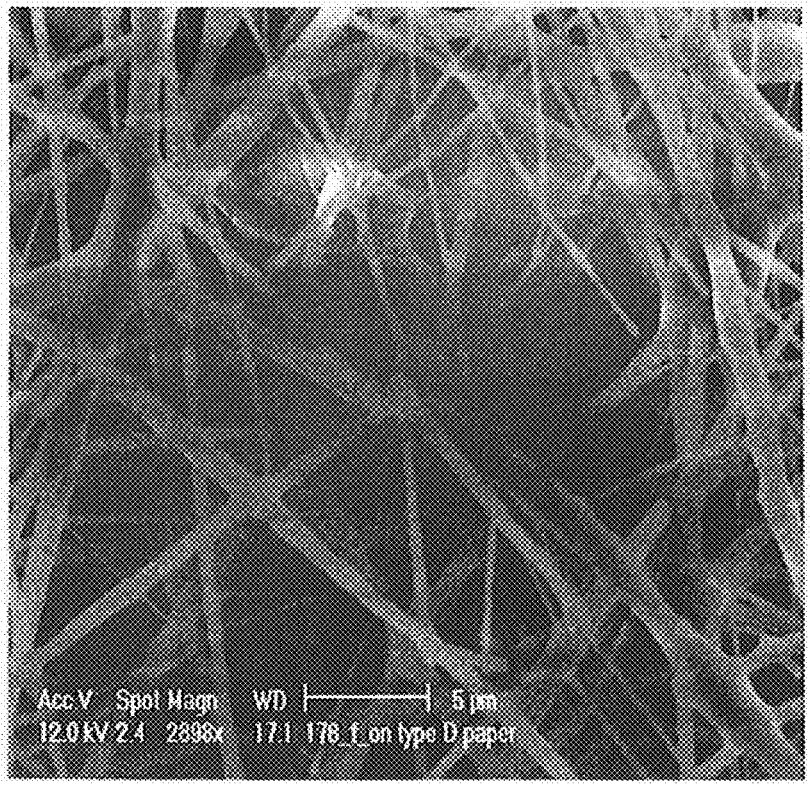

(d) Fluorinated Tin Oxide ($SnO_2$) Fibers:

$SnO_2$ fibers were formed in a similar manner using pluronic P-123 as the micelle forming surfactant and $SnCl_4$ as the metal source. A typical precursor gel was prepared by adding the metal chloride to an ethanolic solution of the surfactant. Metal chloride was added drop wise under constant stirring as metal chlorides react violently with ethanol. The molar ratios used in this preparation were 0.00034 P-123:0.1 ethanol:0.01 $SnCl_4$. The clear reaction mixture obtained was heated at 65° C. to obtain a clear viscous gel for electrospinning. Fluorine was introduced into the reaction mixture by adding 0.005 moles of trifluoroacetic acid keeping the rest of the procedure same. FIG. 10 shows the SEM images of the fluorinated $SnO_2$ fibers obtained by electrospinning.

Figure 11:
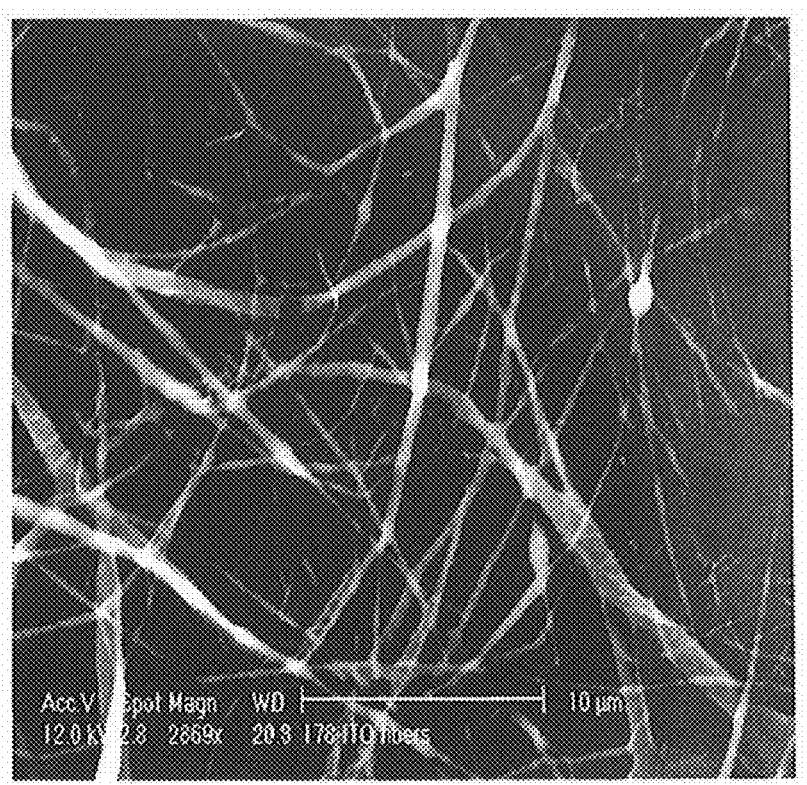
FIG. 11 (panels "a" and "b") represents SEM images of Indium tin oxide fibers.
Figure 11:
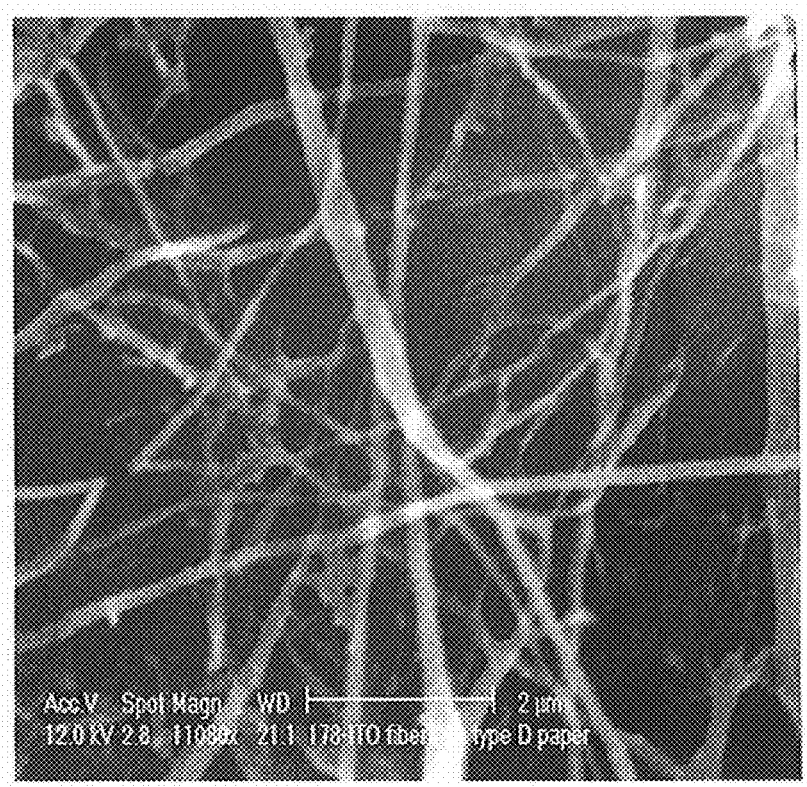

(e) Mixed Metal Oxide Fibers:

Indium Tin Oxide (ITO) Fibers:

ITO fibers were electrospun with different amounts of tin in the mixture. For a gel preparation, indium acetate was added to 2 gm of dry, absolute ethanol to which tin (IV) chloride was added followed by concentrated HCl. Thus formed clear solution of these metal precursors was added to the ethanolic solution of the surfactant P-123. The entire mixture was heated at 65° C. for 16-18 hours to form a clear viscous gel suitable for electrospinning. Different amounts of tin were added to study the electronic conductivity of the fibers obtained. The fibers obtained were heated at 90° C. for further condensation. FIG. 11 shows the SEM images of the fibers obtained with In:Sn ratios of 7:3.

Figure 12:
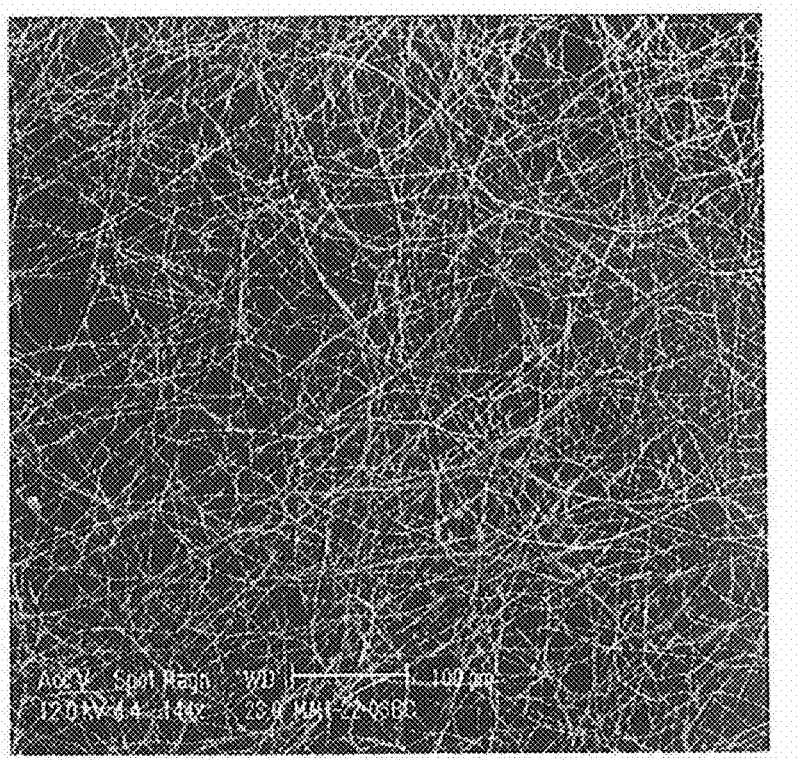
FIG. 12 (panels "a" and "b") represents SEM images of vanadium and titanium mixed metal oxide fibers before and after calcination.
Figure 12:
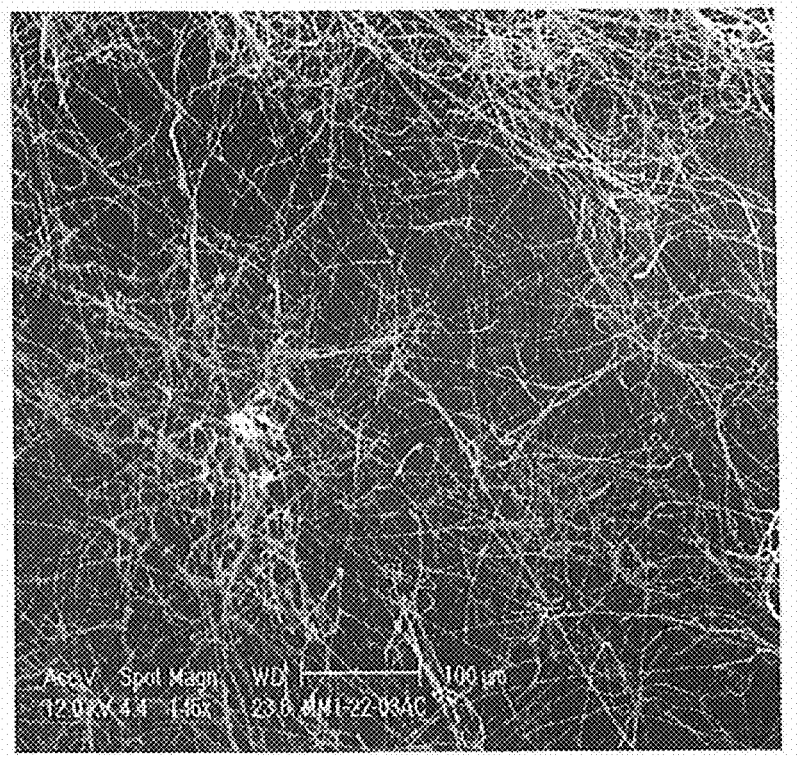

Vanadium and Titanium Mixed Metal Oxide Fibers:

The precursor gel for Vanadium and titanium mixed metal oxide fibers was formed by using $VO(OC_3H_7)_3$ and $Ti(OC_4H_9)_4$ as the metal precursors and Brij 76 as the micelle forming surfactant in presence of ethanol and acetic acid. The molar ratios used in this preparation were 0.0014 Brij 76:0.13 ethanol:0.01 $CH_3COOH$:0.005 $VO(OC_3H_7)_3$:0.005 $Ti(OC_4H_9)_4$. The metal alkoxides were suspended in ethanol and acetic acid mixture and this suspension was added to the ethanolic solution of the surfactant. The resulting green, clear reaction mixture was heated at 45-50° C. to obtain a dark green viscous get for electrospinning. The fibers of vanadium and titanium mixed metal oxide forms beautiful webs which can be picked up. The fibers formed were heated at 130° C. for further condensation and calcined at 500° C. to remove the surfactant. FIG. 12 shows the SEM images of the fibers obtained before and after calcinations.

Figure 13:
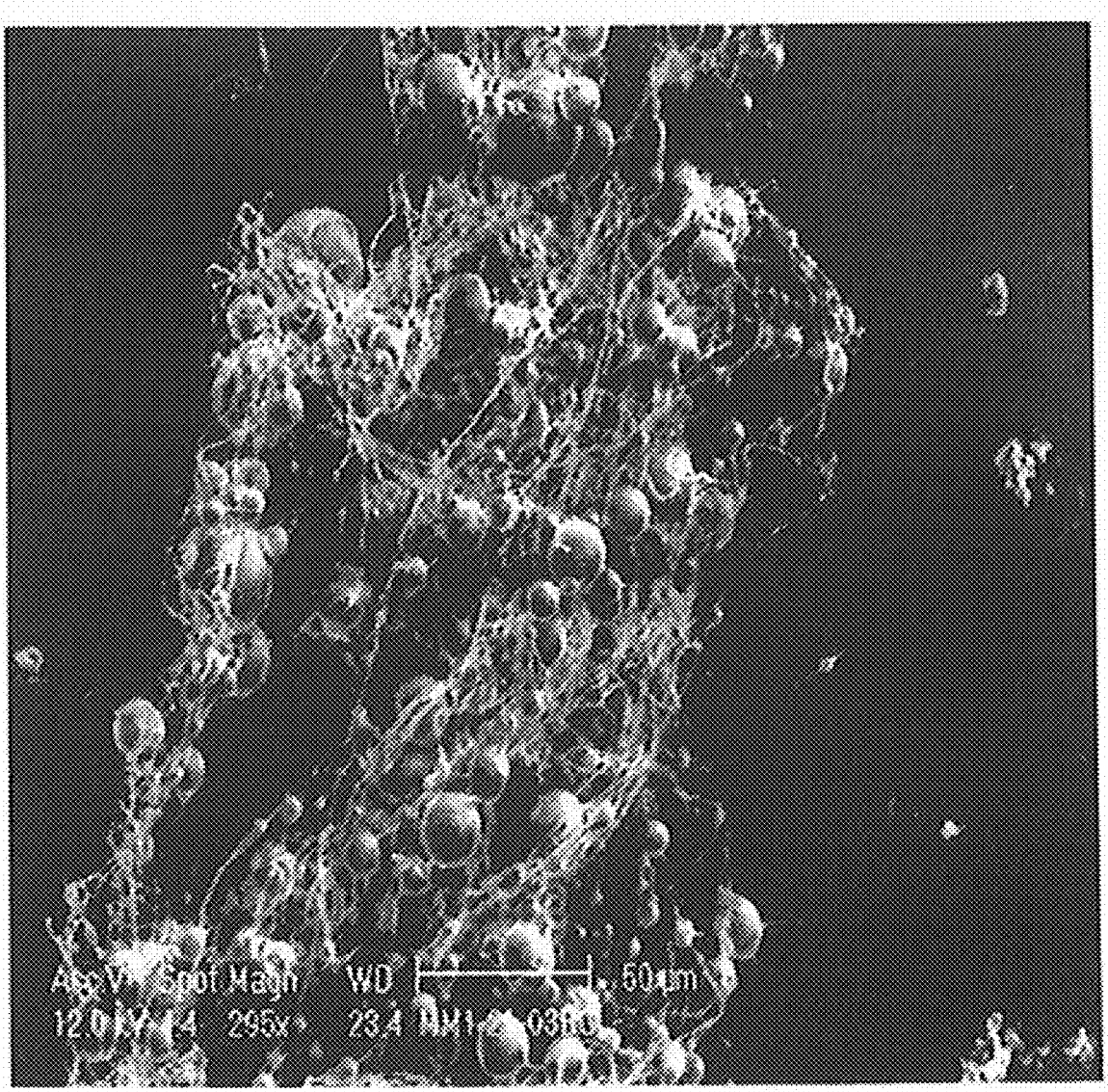
FIG. 13 represents SEM images of niobium and tantalum mixed metal oxide fibers before calcination.

Niobium and Tantalum Mixed Metal Oxide Fibers:

Niobium and tantalum mixed metal oxide fibers were formed in as similar way as the other mixed metal oxides. $NbCl_5$ and $TaCl_5$ were used as the metal precursors and Brij 76 was used as the micelle forming surfactant in 1-propanol. The metal chlorides were suspended by drop wise addition and constant stirring in 1-propanol and concentrated HCl mixture and this suspension was added to a solution of Brij 76 in 1-propanol. The final molar ratios of the reactants were 0.0014 Brij 76:0.1 1-propanol:0.017 concentrated HCl:0.005 $NbCl_5$:0.005 $TaCl_5$. The clear reaction mixture obtained was heated at 45-50° C. to obtain a clear viscous gel for electrospinning. The fibers formed were heated at 90° C. for further condensation and calcined at 500° C. to remove the surfactant. FIG. 13 shows the SEM images of the fibers obtained before calcination.

What is claimed is:

1. A fiber, wherein said fiber consists of a mesoporous molecular sieve, and wherein the mesoporous molecular sieve consists of an organosilane, vitamin E TPGS, an acid, an alcohol and water.

2. The fiber of claim 1, wherein the organosilane is selected from the group consisting of tetramethylorthosilicate, phenyltrimethoxy silane, p-aminophenyltrimethoxy silane, phenyl-trimethylchlorosilane and trimethylchlorosilane.

3. The fiber of claim 1, wherein said fiber has a diameter ranging from about 10 nanometers up to about 1,000 nanometers.

4. A network of fibers wherein, said network is made up of fibers said fibers consisting of a mesoporous molecular sieve wherein, said fibers are produced by electrospinning, and wherein the mesoporous molecular sieve consists of an organosilane, vitamin E TPGS, an acid, an alcohol and water.

5. The fibers of claim 4, wherein the organosilane is selected from the group consisting of tetramethylorthosilicate, phenyltrimethoxy silane, p-aminophenyltrimethoxy silane, phenyl-trimethylchlorosilane and trimethylchlorosilane.

* * * * *